US012515843B2

(12) United States Patent
Balaban et al.

(10) Patent No.: US 12,515,843 B2
(45) Date of Patent: *Jan. 6, 2026

(54) CONSOLE TO STORE PERSONAL ITEMS

(71) Applicant: Ebite, Inc., Wilmington, DE (US)

(72) Inventors: Bogdan Balaban, Buchare (RO); Andrei Alexandru Amarasteanu, Buchare (RO)

(73) Assignee: Ebite, Inc., Dover, DE (US)

( * ) Notice: Subject to any disclaimer, the term of this patent is extended or adjusted under 35 U.S.C. 154(b) by 199 days.

This patent is subject to a terminal disclaimer.

(21) Appl. No.: 18/473,424

(22) Filed: Sep. 25, 2023

(65) Prior Publication Data

US 2024/0010382 A1 Jan. 11, 2024

Related U.S. Application Data

(63) Continuation-in-part of application No. 17/510,476, filed on Oct. 26, 2021, now Pat. No. 11,801,972, (Continued)

(51) Int. Cl.
*B65D 1/34* (2006.01)
*B65D 25/06* (2006.01)
*H02J 50/10* (2016.01)

(52) U.S. Cl.
CPC ............... *B65D 1/34* (2013.01); *B65D 25/06* (2013.01); *H02J 50/10* (2016.02)

(58) Field of Classification Search
CPC ........ B65D 24/02; B65D 25/04; B65D 25/06; B60N 3/001; B60N 3/002; A47B 23/00;
(Continued)

(56) References Cited

U.S. PATENT DOCUMENTS

| | | | |
|---|---|---|---|
| 698,558 | A | 4/1902 | Rosenbaum |
| 2,335,016 | A | 11/1943 | Lorenzen |

(Continued)

OTHER PUBLICATIONS https://www.instructables.com/Gyroscopic-Cup-Holder/ (accessed Nov. 16, 2021).

(Continued)

*Primary Examiner* — Andrew T Kirsch
(74) *Attorney, Agent, or Firm* — Rogowski Law LLC

(57) ABSTRACT

A console for storing personal items has a tub defining an inner volume onto which tub a windowed spacer guide frame defining at least a first window and a second window is removably installed. A tray is removably held within the first window, and defines at least one slot to hold an electronic device. A self-centering cup holder is removably held within the second window. The self-centering cup holder is gimbaled to a frame so that a cup or beverage container held within the cup holder remains stably supported upright notwithstanding movement or canted orientation of the tub and/or the spacer guide frame. Optionally, a snack cup is held within the second window, spaced apart from the self-centering cup holder by a spacer guide. The spacer guide has flaps that splay open to cover a greater portion of the second window as desired. Optionally, the tub is removably seated in a supporting shell. Optionally, a cover for the tub forms a tray table surface, with portions of the tray slidably extendable away from one another to enlarge the tray table surface when the cover is separated from the tub.

16 Claims, 12 Drawing Sheets

Related U.S. Application Data which is a continuation-in-part of application No. 29/761,935, filed on Dec. 14, 2020, now Pat. No. Des. 970,988.

(58) Field of Classification Search

CPC ................ A47B 23/04; A47B 23/0002; A47B 2023/049

See application file for complete search history.

(56) References Cited

U.S. PATENT DOCUMENTS

| | | | | |
|---|---|---|---|---|
| 3,240,610 | A | | 3/1966 | Cease |
| 3,804,233 | A | | 4/1974 | Gregg, Jr. |
| 3,880,485 | A | | 4/1975 | Schmelzer |
| 4,251,006 | A | | 2/1981 | Smith |
| 4,826,058 | A | | 5/1989 | Nakayama |
| 4,946,058 | A | | 8/1990 | Stamm |
| 5,337,677 | A | | 8/1994 | Peeno |
| 5,460,102 | A | | 10/1995 | Pasmanick |
| 5,562,331 | A | | 10/1996 | Spykerman et al. |
| 5,732,849 | A | | 3/1998 | Brooks |
| 6,343,835 | B1 | | 2/2002 | Ledbetter |
| 7,326,428 | B2 | | 2/2008 | Weir |
| 7,448,675 | B1 | | 11/2008 | Lowery |
| 7,780,034 | B1 | | 8/2010 | Richardson |
| 8,051,514 | B2 | | 11/2011 | Yarmer et al. |
| 8,171,584 | B2 | | 5/2012 | Matthews et al. |
| 8,181,291 | B2 | | 5/2012 | Matthews et al. |
| 8,584,284 | B2 | | 11/2013 | Matthews et al. |
| 8,807,051 | B2 | * | 8/2014 | Johnson ................. B60N 2/787 108/43 |
| D821,131 | S | | 6/2018 | Anderson |
| 10,086,734 | B2 | | 10/2018 | Ferreira Orta |
| 10,994,892 | B2 | | 5/2021 | Bell et al. |
| 11,801,972 | B2 | * | 10/2023 | Balaban ................. A47G 19/30 |
| 2003/0226945 | A1 | | 12/2003 | Pacher et al. |
| 2004/0129707 | A1 | | 7/2004 | Weir |
| 2005/0035618 | A1 | | 2/2005 | Toth et al. |
| 2013/0341338 | A1 | | 12/2013 | Mitchell et al. |
| 2014/0237724 | A1 | | 8/2014 | Matthews et al. |
| 2017/0101301 | A1 | | 4/2017 | Volin |
| 2017/0240085 | A1 | | 8/2017 | Ferreira Orta et al. |
| 2018/0249856 | A1 | | 9/2018 | Samartgis |
| 2019/0133315 | A1 | | 5/2019 | Sherman et al. |
| 2019/0375551 | A1 | | 12/2019 | Bell et al. |

OTHER PUBLICATIONS https://www.mygift.com/products/vintage-gray-wood-all-in-one-snack-caddy-with-remote-control-phone-and-cup-2 holders (accessed Nov. 16, 2021).

* cited by examiner

CONSOLE TO STORE PERSONAL ITEMS

CROSS-REFERENCE TO RELATED APPLICATION

This application is a continuation-in-part under 35 USC § 120 of U.S. Ser. No. 17/510,476, filed Oct. 26, 2021, status pending, which was a continuation-in-part under 35 USC § 120 of U.S. Ser. No. 29/761,935, filed Dec. 14, 2020, status patented.

FIELD OF THE INVENTION

The present invention is generally directed to a portable container for storing personal items that incorporates a removable windowed spacer guide frame and various modular removable storage compartments and/or trays that are supported within the container by the spacer guide frame. A self-balancing cup holder is among the modular removable storage compartments that may be supported by the spacer guide frame.

BACKGROUND OF THE INVENTION

When seated on upholstered furniture, it is desirable to have easy access to snacks, drinks, electronics and other personal items. Often, these various items are placed on coffee tables or on TV snack trays positioned adjacent to or in front of the upholstered furniture. Such position can be awkward for the seated individual to access. Moreover, drink cups and containers can be knocked over and personal items can be lost among other items found on such tables or trays.

Individuals seated on sofas often prefer to have snacks and personal items closely adjacent to them rather than in front of them, but the upholstered furniture cushions and armrests do not permit open containers to be safely placed thereon without risk of spillage. And other personal items can be lost or misplaced among upholstered furniture cushions.

Accordingly, improvements for organizing and storing personal items, and holding snacks, drinks, electronics together for easy access to a person when seated on upholstered furniture continue to be sought.

BRIEF SUMMARY OF THE INVENTION

A console for holding and/or storing personal items has a tub or container with one or more upstanding sidewalls surrounding a bottom wall to define an inner volume. In an embodiment, the tub is integrally molded of a semi-rigid foam, such as a foamed polymeric material, and has a generally rectangular or square bottom wall with rounded corners, and has upstanding sidewalls terminating at a curved rim at the top. A shelf surface located below the rim extends into the inner volume of the tub. In an embodiment, the shelf surface forms a continuous ring projecting from the inner surface(s) of the sidewall(s).

A spacer guide frame is removably held within the inner volume of the tub, said spacer guide frame defining at least two open windows therein. The spacer guide frame rests on the top rim of the tub. In an embodiment, a grip tab extends from the spacer guide frame by which a user may grasp the spacer guide frame to remove it from inside the tub inner volume. In an embodiment, a USB C hub is disposed on or in the spacer guide frame. The USB C hub, when present, is configured for connection to a connecting cord for an electronic device and for connection to a battery stored within the volume of the tub.

A tray is removably seated in the first one of the at least two open windows of the spacer guide frame. The tray has a top surface defining a slot opening therethrough. The slot opening is sized to accommodate an electronic device, such as a cellular phone, which may be removably held in the slot opening. In an embodiment a tab extends from the tray by which a user may grasp the tray to remove it from the spacer guide frame. In an embodiment, the top surface of the tray has a recessed area to accommodate personal items, such as but not limited to, eyeglasses, a TV remote, a video game controller unit, and/or a pill case. In an embodiment, an inductive battery charger for electronic devices is associated with the tray, so that batteries of electronic devices in contact with the tray may be charged.

A cup holder is removably seated in the second one of the at least two open windows of the spacer guide frame. The cup holder has at least one upstanding sidewall surrounding a cup holder bottom wall to define an inner volume configured to receive a beverage container or cup. A plurality of buttons project radially into the inner volume from the cup holder upstanding sidewall that are configured to contact a sidewall of the beverage container or cup. The buttons may urged into the inner volume of the cup holder by associated springs. Alternatively, the buttons may comprise resiliently bendable material, such as a polymeric material, latex or rubber or a compressible foam. An upper frame surrounds a top rim of the cup holder, and this upper frame is supported at least in part by the spacer guide frame.

The cup holder is self-adjusting so that contents of a beverage cup or container are continuously kept upright to avoid significant spilling of their contents when the console is supported on other than a flat horizontal surface. The self-adjustment is by a gimbal mechanism. A gimbal ring is joined for rotational tilting movement to the top rim of the cup holder and is joined for rotational tilting movement to the upper frame. In an embodiment, the gimbal ring is connected to the top rim of the cup holder by a first pair of dowel pins juxtaposed opposite one another along a first diameter of the cup holder. Concurrently, the gimbal ring is connected to the upper frame surrounding the top rim of the cup holder by a second pair of dowel pins juxtaposed opposite one another along a second diameter of the cup holder that is substantially perpendicular to the first diameter of the cup holder. In an embodiment, a counterweight is installed within the cup holder or is positioned on the bottom wall of the cup holder. In an embodiment, the counterweight is a disk-shaped metal slug.

In another advantageous embodiment of the console, a snack cup is removably seated in the second one of the at least two open windows in the spacer guide frame. The snack cup defines an inner volume to receive personal items, such as but not limited to, hair clips and paper clips, or food items, such as but not limited to, potato chips, popcorn, pretzels, and candies.

Where both the cup holder and the snack cup are removably installed within the same open window of the spacer guide frame, the console may include a spacer unit positioned between the cup holder and the snack cup. The spacer unit has hinged flaps adapted for rotation in respect of a center bar of the spacer unit. One or both of the hinged flaps is configured to rotate from a first closed orientation to a second open orientation. In the open configuration, more of the second open window of the spacer guide frame is covered over by the hinged flaps to close access to the inner volume of the tub. Thus, the spacer unit may be in its closed configuration to keep spacing distance between the cup holder and the snack cup when both are present in the same open window of the spacer guide frame. Alternatively, where either one of the cup holder or the snack cup is removed from the console, open space in the open window of the spacer guide frame may be covered over by the spacer guide with the hinged flaps in the open configuration.

The console has a modular design wherein the spacer guide frame, the tray, and the cup holder are removably seated in the tub. Optionally, the snack cup and the spacer unit are removably seated within the same window of the spacer guide frame as the cup holder. At the user's option, the inner volume of the tub may contain one or more personal items for storage, accessible by lifting the tray to expose the inner volume. At the user's option, the open windows of the spacer unit may hold combinations of multiple cup holders, multiple snack cups or multiple trays. In an advantageous embodiment, all components of the console, including the tub, the spacer guide frame, the tray, the cup holder, the snack cup and the spacer unit are washable with dish liquid. Most preferably, all components of the console, including the tub, the spacer guide frame, the tray, the cup holder, the snack cup and the spacer unit are washable in an automatic dish washer.

In another advantageous embodiment the console includes a top cover that when disposed over the spacer guide frame covers over the tub inner volume. In an embodiment, the top cover has a first tray and a second tray that are slidably joined to one another. In such embodiment, the first tray and the second tray are slidably engaged to one or more guide rails held within guide rail channels defined in the first tray and in the second tray. In the closed configuration, a front edge of the first tray is adjacent and contacts a front edge of the second tray. In an open configuration, the front edges of the first tray and second tray are spaced apart from one another. When not installed over the console, the top cover may be used as a tray to support a laptop computer or other article.

In still another advantageous embodiment the console may include an adapter that is removably held within the snack cup. The adapter defines a central opening configured to receive a drink mug that has a mug handle, and further defines at least one groove communicating with the central opening that is configured to receive the mug handle when the drink mug is held within the snack cup.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings an embodiment of a console for storing personal items that is presently preferred. It should be understood, however, that the disclosure is not limited to the precise arrangements and instrumentalities shown. In the drawings.

DESCRIPTION OF THE DISCLOSURE

Figure 1:
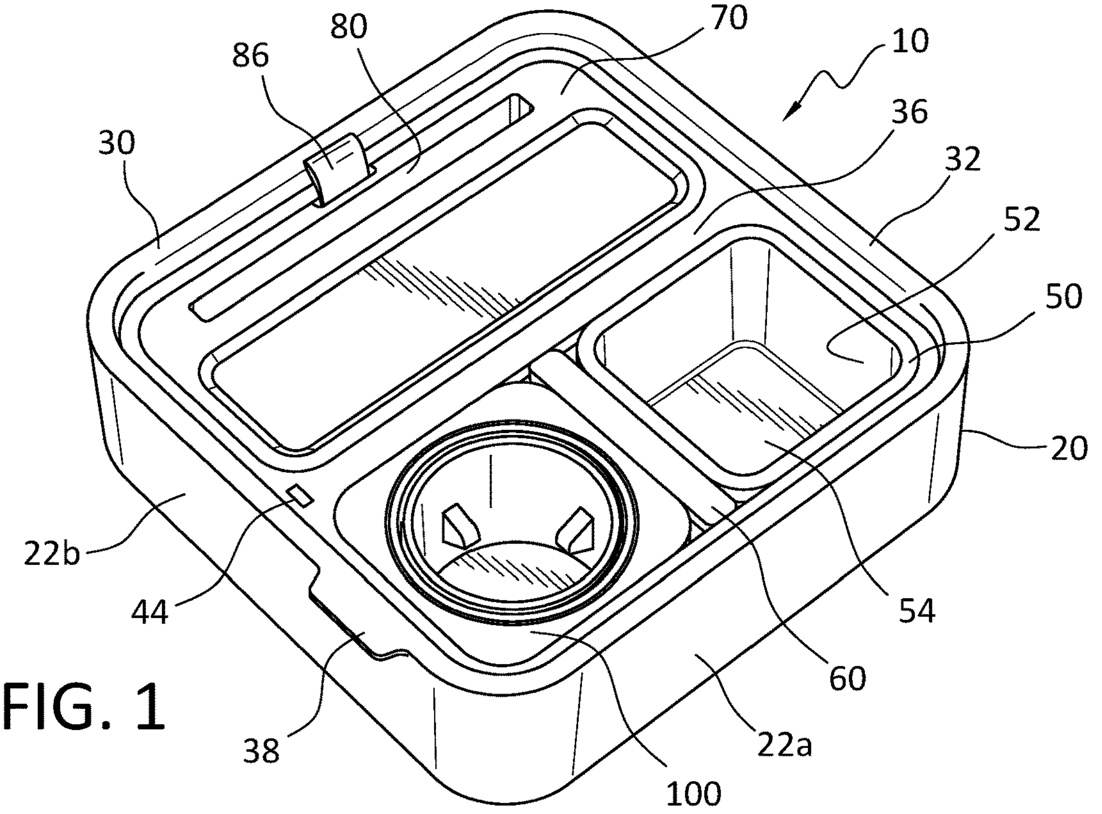
FIG. 1 is a left front perspective view of a console for storing personal items according to an embodiment of the invention.
Figure 2:
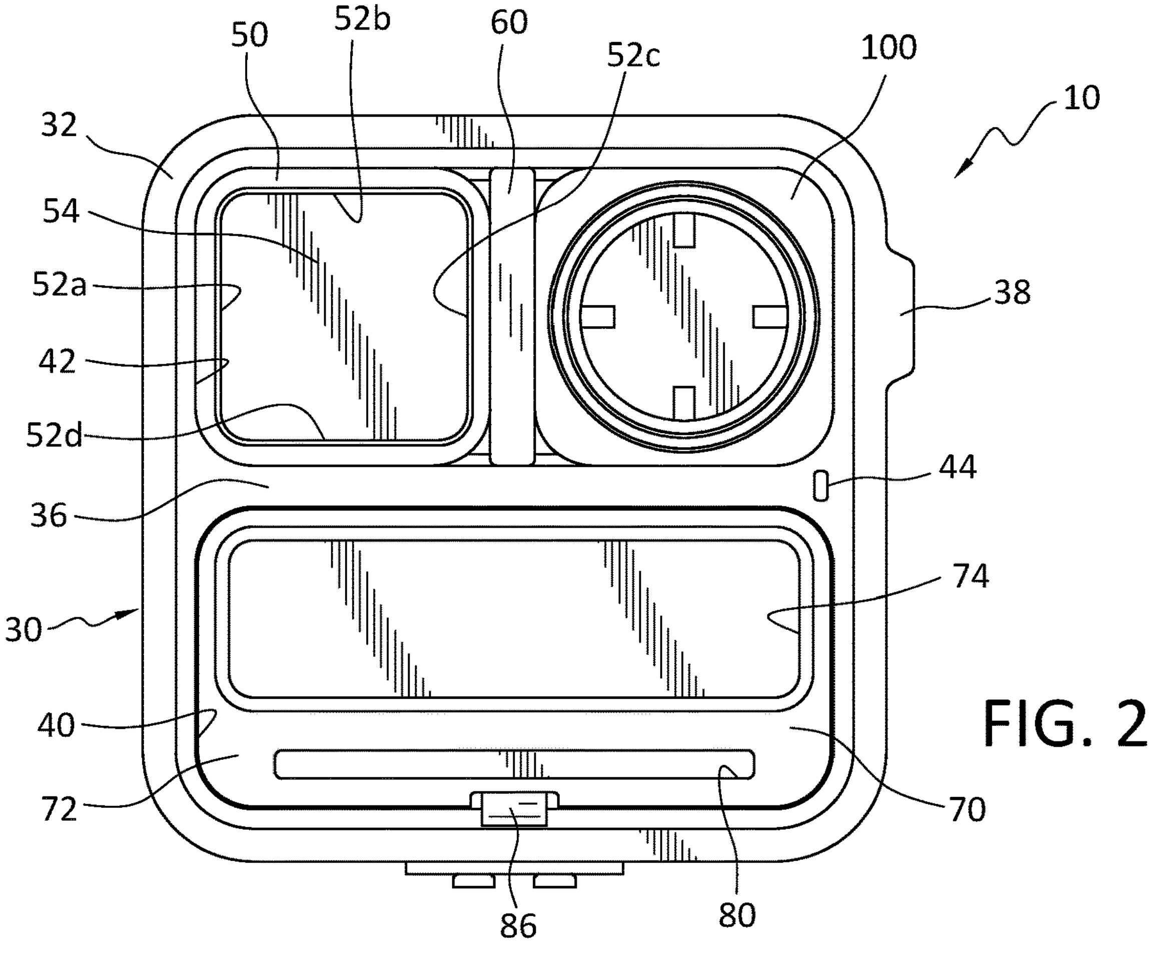
FIG. 2 is a top plan view of the console for storing personal items of FIG. 1.
Figure 3:
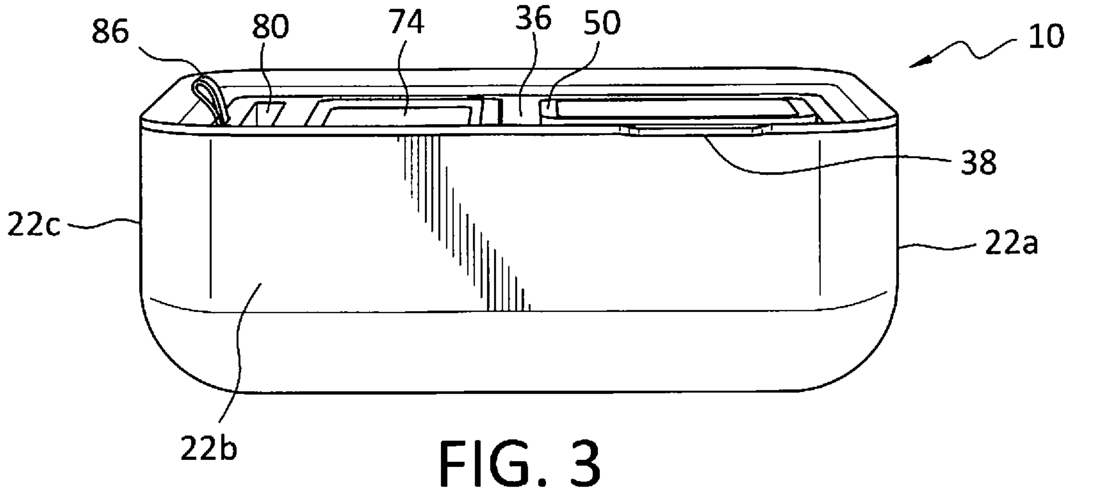
FIG. 3 is a left side view of the console for storing personal items of FIG. 1.
Figure 4:
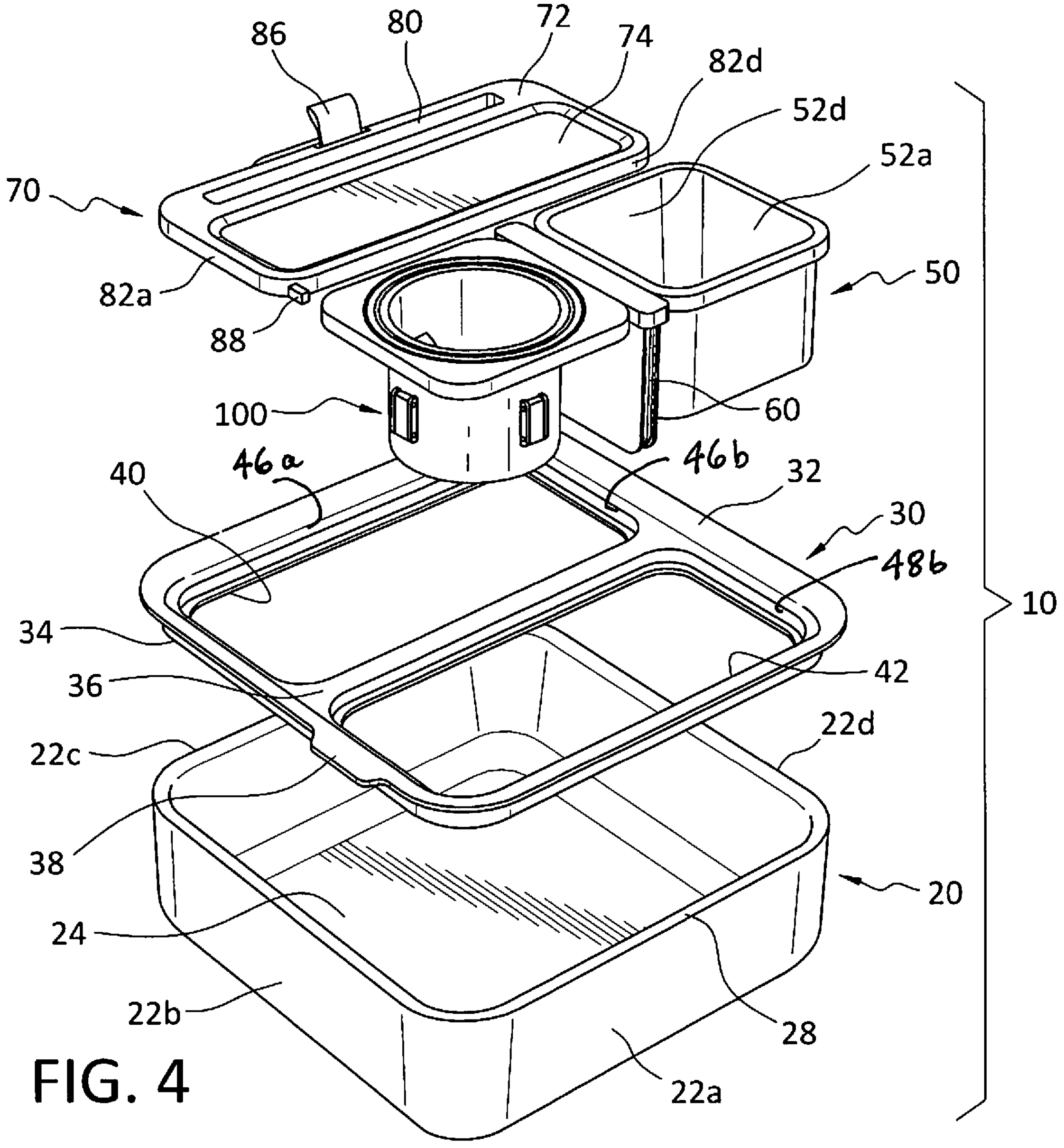
FIG. 4 is an exploded view of the console for storing personal items of FIG. 1.

Certain terminology is used in the following description for convenience only and is not limiting. Unless specifically set forth herein, the terms "a." "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

The present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s). The following description is provided to enable any person skilled in the art to make and use the invention and sets forth the best modes contemplated by the inventors of carrying out their invention. Various modifications, however, will remain readily apparent to those skilled in the art without departing from the spirit and scope of the invention, which is defined by the accompanying claims.

It should be noted that steps recited in any method claims below do not necessarily need to be performed in the order in which they are recited. Those of ordinary skill in the art will recognize variations in performing the steps from the order in which they are recited. In addition, the lack of mention or discussion of a feature, step or component provides the basis for claims where the absent feature or component is excluded by way of a proviso or similar claim language.

FIGS. 1-4 illustrate a console 10 to store personal items, including but not limited to, drinks 12, 13, snacks 14, 15, electronic devices such as cellular telephones 16 and tablet computers 17, video game handsets 18, and television remotes 19. The console 10 is portable, and may be hand-carried to various locations in a home or business. For example, the console 10 may be positioned on a seating surface or hand rest surface of upholstered seating, such as a couch or loveseat.

The console 10 shown in FIGS. 1-4 has the form of a tub 20 or bucket or container with upstanding sidewalls 22*a*, 22*b*, 22*c*, 22*d* surrounding a bottom interior wall 24 to define an interior volume inside the tub 20. The sidewalls 22*a*, 22*b*, 22*c*, 22*d* terminate at a top rim 28.

The tub 20 may be formed of semi-rigid foam material, or may be molded of a thermoplastic material. One representative tub is a foam of ethyl 3-ethoxyproprionate (EEP). Another representative tub is molded from acrylonitrile-butadiene-styrene (ABS) terpolymer. If the tub 20 is a semi-rigid foam, it may incorporate recycled polyurethane foam materials. If the tub 20 is molded of thermoplastic, the thermoplastic may incorporate recycled plastic. The base of the tub may be a square of approximately 12 inches by 12 inches, with a height of approximately 4 inches.

A spacer guide frame 30 has a surrounding top lip 32 and a sidewall 34 depending downwardly from the surrounding top lip 32. The surrounding top lip 32 engages over the top rim 28 of the tub 20, and the sidewall 34 fits into a portion of the inner volume of the tub 20. A center beam 36 extends across the spacer guide frame 30. The spacer guide frame 30 defines a first oblong window 40 and a second oblong window 42. The first window 40 and second window 42 remain open to the inner volume of the tub 20 when the spacer guide frame 30 is installed onto the top rim 28 of the tub 20. The spacer guide frame 30 is rigid or semi-rigid. In one embodiment, the spacer guide frame 30 is molded thermoplastic, such as molded acrylonitrile-butadiene-styrene (ABS) terpolymer.

The inner edges of the first window 40 and the second window 42 of the spacer guide frame 30 may be curved or rounded, and terminate at rims or shelf edges 46, 48. The spacer guide frame 30 may have a stepped rim to rigidify the upper rims or shelf edges 46, 48.

In the embodiment shown in FIGS. 1-4, a tab 38 extends from the surrounding top lip 32 of the spacer guide frame 30. A user may grasp the tab 38 in order to remove the spacer guide frame 30 from the tub 20, or to adjust position of the spacer guide frame 30 within the tub 20. The tab 38 may be marked with indicia, such as a product trademark or user instructions.

In the embodiment shown in FIGS. 1-4, a charging plug receptacle 44 or USB C hub is housed in a portion of the spacer guide frame 30. When the USB C hub is present, a battery or other energy storage unit (not shown in the Figures) may be held within the inner volume of the tub 20 and connected by wire connection to one side of the USB C hub. The charging cord 45 for an electronic device may be connected to the USB C hub.

A tray 70 is removably installed in the first window 40 of the spacer guide frame 30. At the user's discretion, the tray 70 alternatively may be removably installed in the second window 42 of the spacer guide frame 30. The tray 70 has a top surface 72 with a recessed area 74 therein. The top surface 72 of the tray 70 is suitable for supporting personal items, such as but not limited to eyeglasses 11, a TV remote 19, a video game controller unit 18, and/or a pill case. The sidewalls 82*a*, 82*b*, 82*c*, 82*d* of the tray 70 seat onto and are supported by the inner edges 46 of the first window 40 of the spacer guide frame 30. A grip tab 86 extends above the top surface 72. A user may grip the grip tab 86 to lift the tray 70 out of the first window 40. In the embodiment shown, the grip tab 86 comprises a reinforced canvas fabric or nylon tape.

In one embodiment, a pivot extension 88 projecting from an edge of the tray 70 may fit within a hole or recess in the spacer guide frame 30 to permit pivoting movement between the tray 70 and the spacer guide frame 30 while the tray 70 remains supported within the first window 40 of the spacer guide frame 30. In such an embodiment, the user may grip the grip tab 86 to pivot the tray 70 on the pivot extension 88 to thereby open the first window 40 for the user to access the inner volume of the tub 20.

The tray 70 has a slot 80 opening that passes through the top surface 72. The slot 80 alternatively may be formed as a recess. The slot 80 or recess has a slot opening sized to accommodate an electronic device, such as a cellular telephone 16 or tablet computer 17, for placement and storage therein. The electronic device may be held in an upright orientation with its bottom edge in the slot 80 or recess, or may be held in a sideways orientation with one side edge in the slot 80 or recess. Compare FIG. 11A with FIG. 11C.

In one embodiment, the tray 70 is provided with an inductive charging mechanism for electronic devices, such as a Qi wireless charging pad. When held on the recessed area 74 of the tray 70, a battery of an electronic device such as a cellular telephone may be charged upon contact. The recessed area 74 may be shaped to accommodate contours of specific electronic devices, such as but not limited to game controller units 18.

Figure 18:
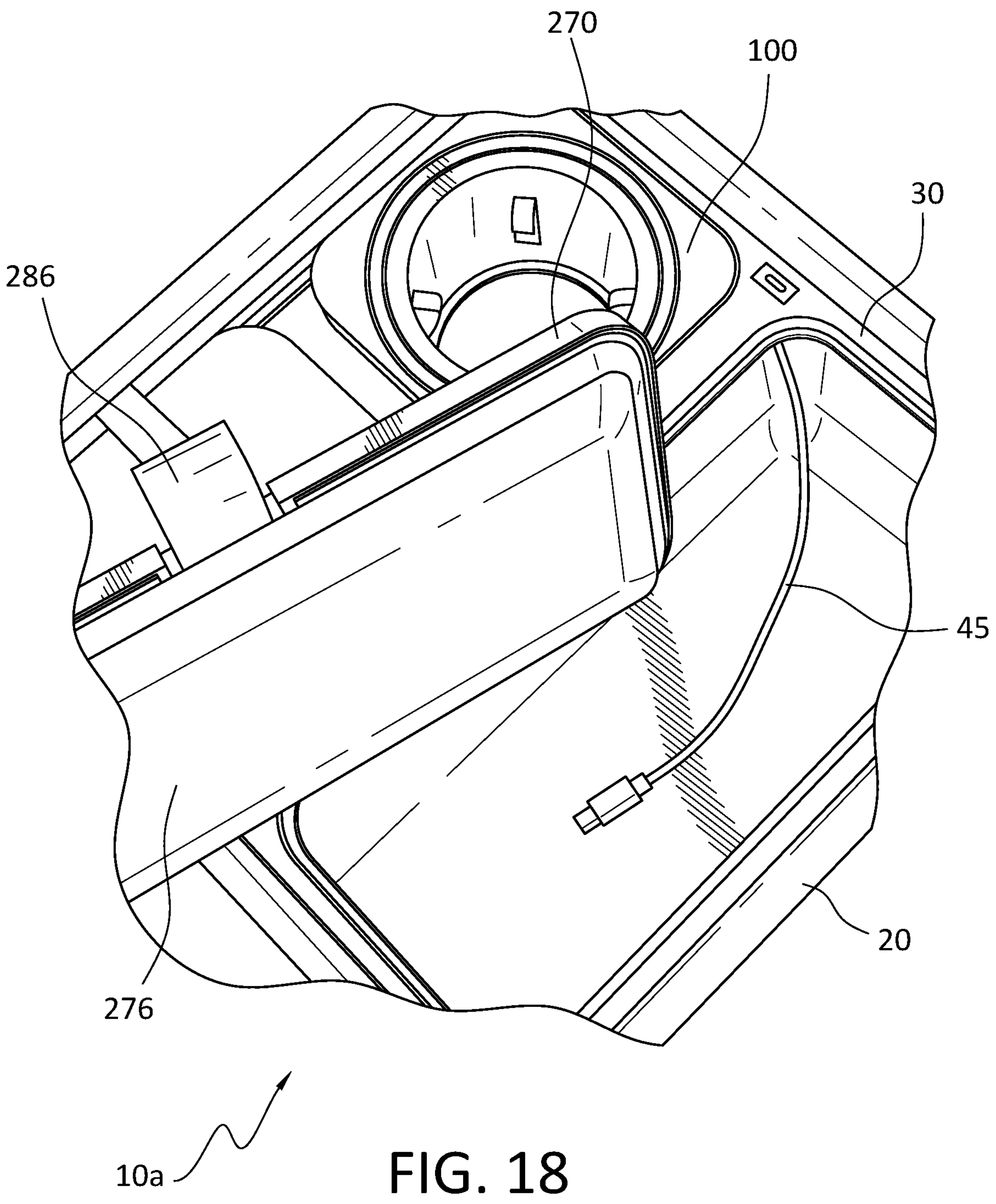
FIG. 18 is a right rear perspective view of a console for storing personal items that includes a padded tray and a charging plug receptacle and charge cord.
Figure 19:
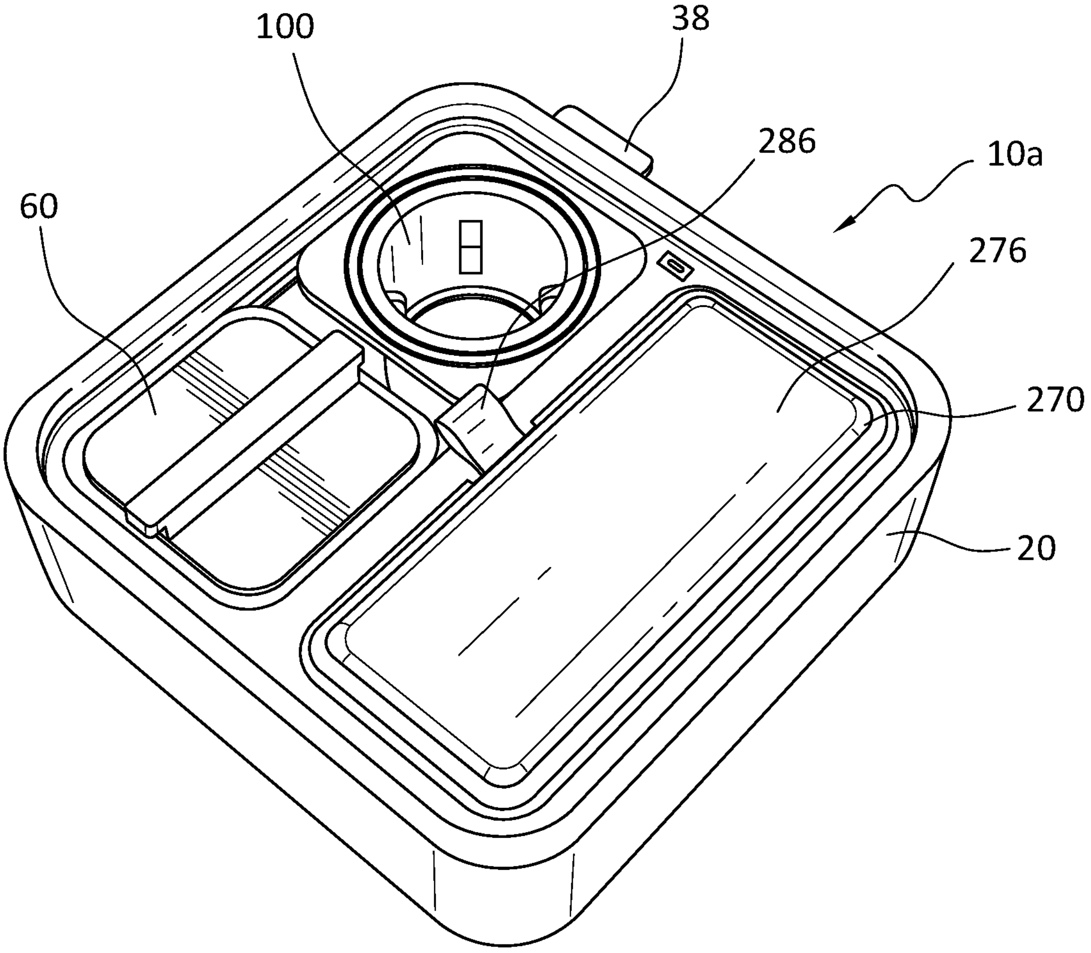
FIG. 19 is a right rear perspective view of the console of FIG. 18 with the tray seated with the padded side up to form an arm rest.

An alternative embodiment of the tray 270 is shown in FIGS. 18 and 19. In this alternative embodiment, the console 10*a* may be converted for use as an arm rest. The tray 270 includes a pad 276 or padding on its bottom surface. The tray 270 may be inverted with its bottom surface facing upwardly as shown in FIG. 19 so that the pad 276 is outwardly directed when the inverted tray is supported within the spacer guide frame 30. In this position, the tray 270 may be used as an arm rest.

A self-adjusting cup holder 100 is removably installed in the second window 42 of the spacer guide frame 30. See FIGS. 5 and 6. The cup holder 100 has a cylindrical sidewall 102 surrounding a bottom wall 104 to create a cylindrical cup shaped cup holder. Buttons 106*a*, 106*b*, 106*c*, 106*d* project radially from the inner wall of the cylindrical sidewall 102 into the inner volume of the cup holder 100. In the embodiment shown in FIGS. 1-6, the tip surfaces of the buttons 106*a*, 106*b*, 106*c*, 106*d* are urged radially into the inner volume by leaf springs 107*a*, 107*b*, 107*c*, 107*d*. The leaf springs may be formed of spring steel, with the button covers formed of thermoplastic, such as ABS. When a cup or other beverage container is placed into the cup holder 100, the buttons 106*a*, 106*b*, 106*c*, 106*d* contact the side surfaces of such cup or container to stabilize the cup or container within the inner volume of the cup holder 100. As another alternative to the spring actuated buttons 106*a*, 106*b*, 106*c*, 106*d*, the buttons may be formed of a resilient or compressible material, such as foam or latex or rubber, so that the buttons compress when a cup or beverage container is placed into the cup holder.

A counterweight 108 may be inserted into the cup holder 100 and placed inside the cup holder 100 over the bottom wall 104. One exemplary counterweight 108 is a circular disk-shaped metal slug. Alternatively, a counterweight may be integrally formed in the cup holder 100, such as by embedding the counterweight into the material forming the cup holder 100.

Figure 5:
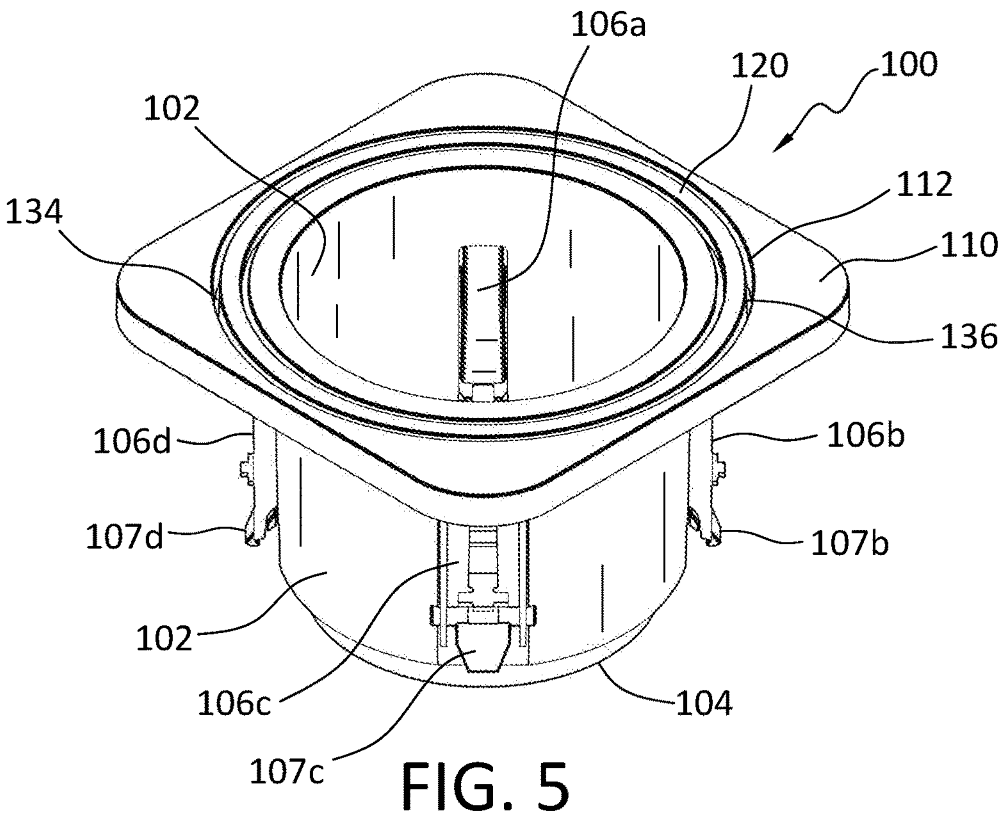
FIG. 5 is a perspective view of a self-centering cup holder that is a component of the console for storing personal items, shown in a first orientation.
Figure 6:
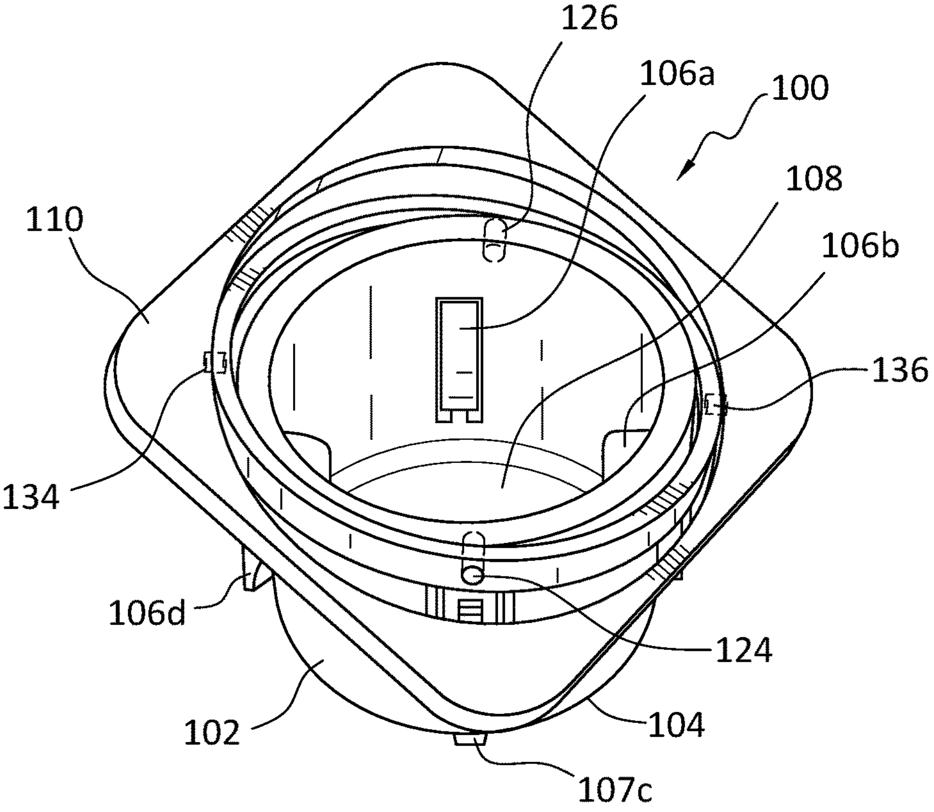
FIG. 6 is a perspective view of the self-centering cup holder of FIG. 5, showing the gimbal movement of the first gimbal and second gimbal of the cup holder.
Figure 7:
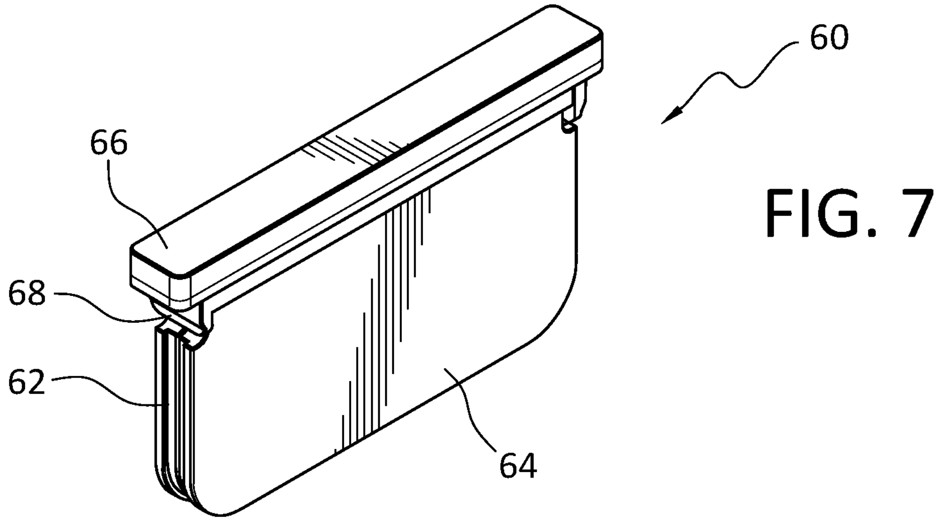
FIG. 7 is a right front perspective view of a spacer guide in closed configuration, which spacer guide is a component of the console for storing personal items.
Figure 8:
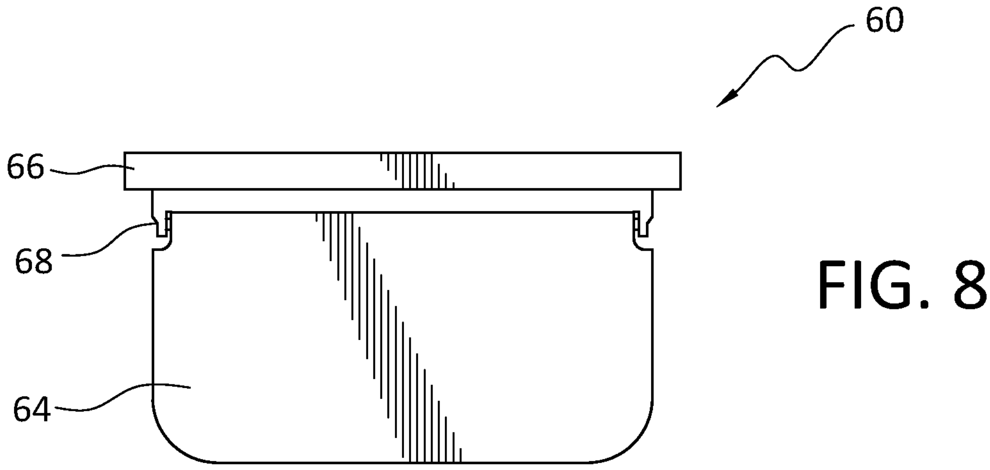
FIG. 8 is a front elevational view of the spacer guide of FIG. 7.

Referring to FIGS. 5 and 6, the cup holder 100 includes an upper rim frame 110 that is spaced apart from and encircles the cylindrical sidewall 102 of the cup holder 100. The upper rim frame 110 defines a circular opening 112. The upper rim frame 110 constitutes a first gimbal. The cup holder 100 further includes a second gimbal that is a ring shape 120 positioned between the upper rim frame 110 and the cylindrical sidewall 102 of the cup holder 100. A first dowel 124 links the ring 120 to the sidewall 102 of the cup holder 100. A second dowel 126 links the ring 120 to the sidewall of the cup holder 100. The first dowel 124 and the second dowel 126 are spaced apart and are aligned with their dowel axes generally in line with a same diameter line of the cylindrical sidewall 102. A third dowel 134 links the ring 120 to the inner edge of the upper rim frame 110. A fourth dowel 136 links the ring 120 to the inner edge of the upper rim frame 110. The third dowel 134 and the fourth dowel 136 are spaced apart and are aligned with their dowel axes generally in line with a same diameter line of the cylindrical sidewall 102, but with said diameter line at an angle, such as perpendicular, to the diameter line along which the first dowel 124 and second dowel 126 are aligned. The ring 120 of the second gimbal is rotatable along the common axis of the first dowel 124 and the second dowel 126. The ring 120 of the second gimbal is rotatable also along the common axis of the third dowel 134 and the fourth dowel 136.

The upper rim frame 110 of the cup holder 100 is seated inside the second window 42 of the spacer guide frame 30, and is supported because at least two rim frame portions contact the inner edges 48 of the second window 42. Alternatively, at the user's discretion, the cup holder 100 may be seated inside the first window 40 of the spacer guide frame 30. The upper rim frame 110 thus maintains its orientation with that of the spacer guide frame 30 and the tub 20 to which the spacer guide frame 30 is removably joined. However, due to the gyroscope movement of the second gimbal or ring 120, the cup holder 100 by rotational movements, coupled with action of the counterweight 108 associated with the cup holder 100, self-adjusts to maintain an upright orientation irrespective of the orientation of the tub 20 and the spacer guide frame 30 within the tub 20. Compare FIG. 5 showing the cup holder 100 in a first configuration without rotation of the ring 120 with FIG. 6 showing the gyroscope movement or rotation of the ring 120 with two degrees of rotation.

In one embodiment, the cupholder 100 and frame 102 are formed of thermoplastic, such as ABS terpolymer, and the gimbal or ring 120 and dowels 124, 126 are formed of a durable thermoplastic, such as polycarbonate (PC).

A snack cup 50 may be held in the second window 42 and supported by the spacer guide frame 30. Alternatively, at the user's discretion, the snack cup 50 may be seated inside the first window 40 of the spacer guide frame 30. The snack cup 50 has upstanding sidewalls 52*a*, 52*b*, 52*c*, 52*d* surrounding a cup bottom 54 to define an inner volume that may receive foodstuffs or personal articles. In the embodiment shown in FIGS. 1-4, the snack cup 50 and the cup holder 100 are both held in the second window 42. In an embodiment, the snack cup 50 is formed of a food grade thermoplastic material, such as polyethylene terephthalate glycol (PETG).

A spacer 60 is positioned between the cup holder 100 and the snack cup 50 in the second window 42 of the spacer guide frame 30 in the embodiment shown in FIGS. 1-4. The spacer 60 has a hinged first panel 62 and a hinged second panel 64 that are rotatably joined to a top bar 66 by pins or projections 68*a*, 68*b*. In FIGS. 1, 3, 4 and 7, the spacer 60 is in a closed configuration with the hinged panels 62, 64 directed downwardly and substantially parallel to one another. The spacer 60 stabilizes positions of the cup holder 100 and the snack cup 50 when held within the second window 42. The spacer 60 may be removed from the second window 42 to facilitate access to the upper rim frame 110 of the cup holder 100 and the upper portion of the sidewalls 52*a*, 52*b*, 52*c*, 52*d* of the snack cup 50 when a user wishes to remove one or both of these from the tub 20.

Figure 9:
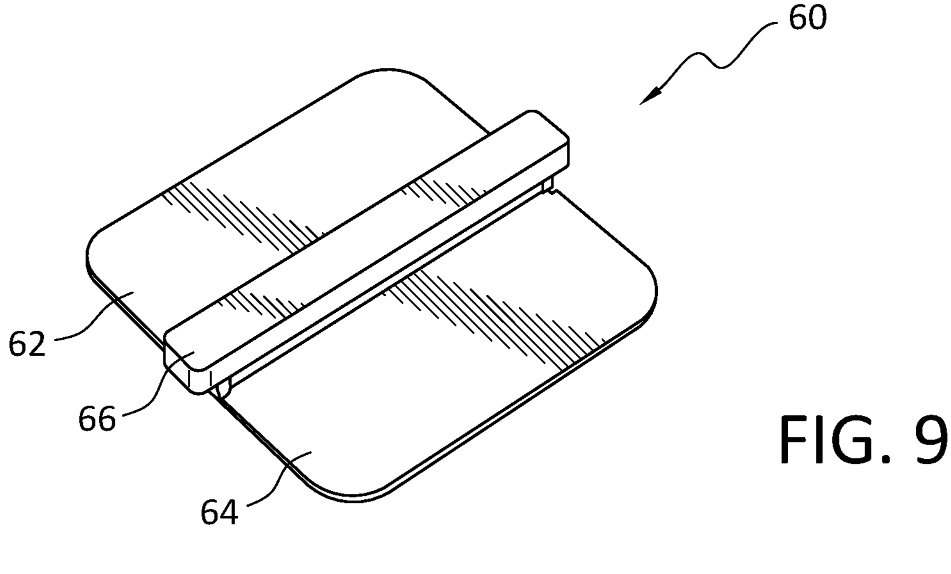
FIG. 9 is a right front perspective view of the spacer guide of FIG. 7 in open configuration.

Alternatively, a user may elect to install only one cup holder 100 (or one snack cup 50) in the second window 42 of the spacer guide frame 30. In such a case, the hinged first panel 62 and the hinged second panel 64 of the spacer 60 may be rotated by 90 degrees to an open configuration (see FIG. 9) so that the spacer may cover the open portion of the second window 42 to close access to the inner volume of the tub 20 and stabilize position of the cup holder 100 within the second window 42. Portions of the edges of panels 62, 64 are supported on the spacer guide frame 30 when the spacer 60 is positioned thereon in its open position.

It is envisioned that a user might interchangeably place a snack cup 50 and a cup holder 100 in a same one of the windows 40, 42, and the tray 70 in another one of the windows 40, 42. Alternatively, it is envisioned that a user might interchangeably place two cup holders 100 in one of the windows 40, 42 and two other cup holders 100 in another one of the windows 40, 42. The tray 70, and the cup holder 100 and the snack cup 50 are of compatible sizes to allow the user to mix and match which of these components to fit within the spacer guide frame 30 of the console 10. In this manner, the console 10 is modular, allowing the user flexibility to fill the tub 20 with desired console components to receive and store items of interest to the user. Each user may customize the console and include different console components as desired at a given time.

In an embodiment, the spacer 60 may be sized to seat over the snack cup 50 when the spacer 60 is in its open position thereby serving as a removable lid or cover for the snack cup 50.

Figure 11A:
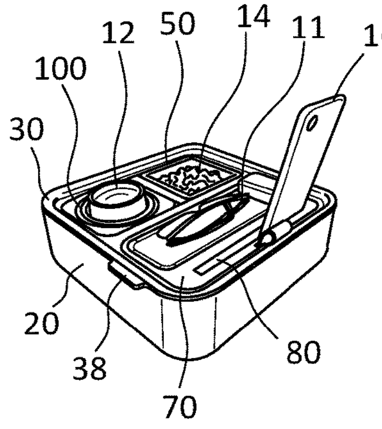
FIG. 11A is a left front perspective view of the console for storing personal items, illustrating optional personal items held therein.
Figure 11B:
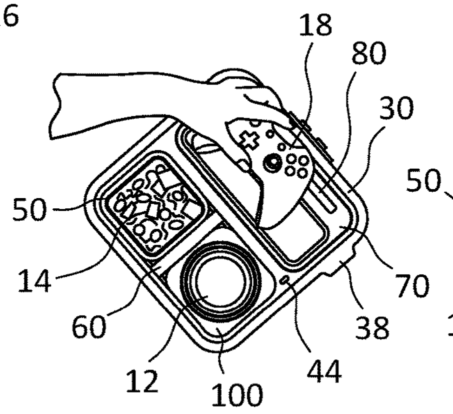
FIG. 11B is a left front perspective view of the console for storing personal items, illustrating other optional personal items held therein.
Figure 11C:
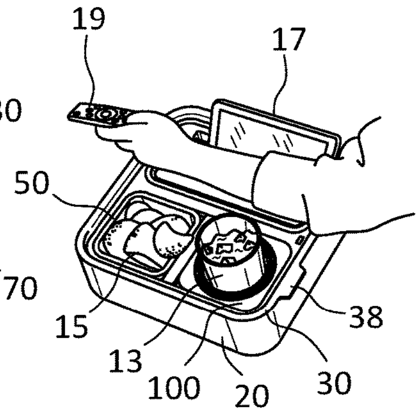
FIG. 11C is a left front perspective view of the console for storing personal items, illustrating still other optional personal items held therein.

As shown in FIGS. 11A-11C, the console 10 may be used to store or hold various personal items, such as but not limited to, eyeglasses 11, drinks 12, 13 in cups or cans or bottles, snacks 14, 15, cellular telephones 16 or other electronic devices like tablet computers 17, video game controllers 18, and television remote controls 19.

Figure 10:
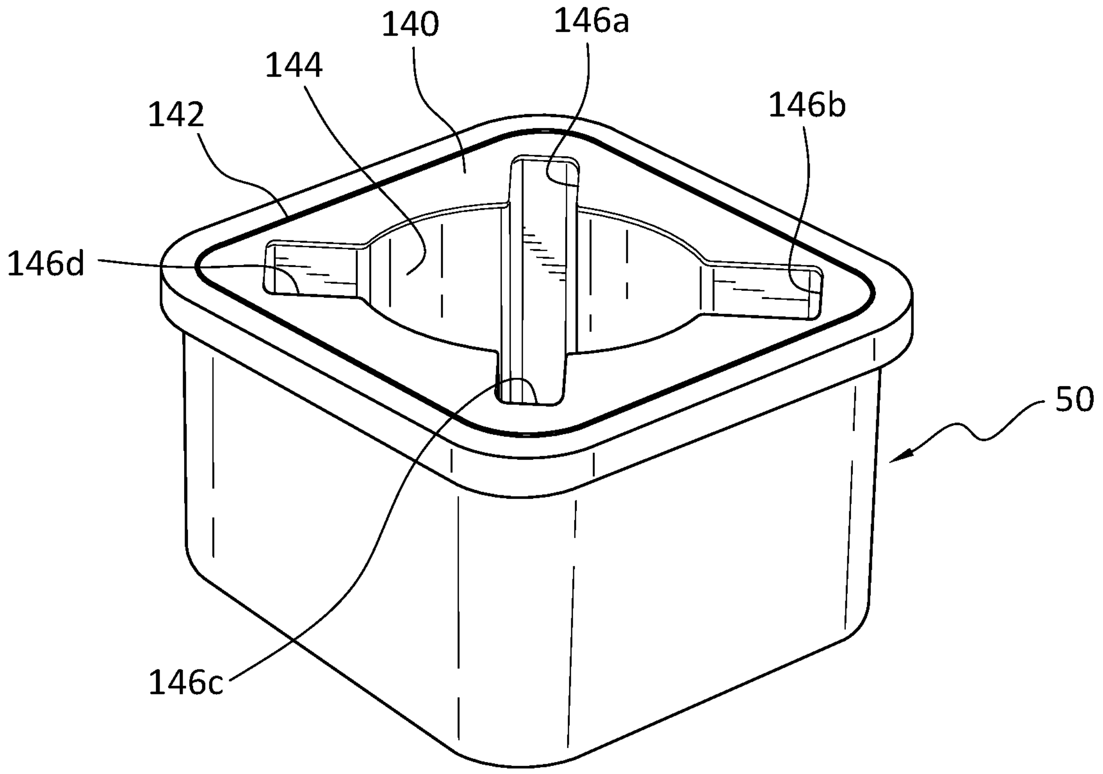
FIG. 10 is a front elevational view of a mug adapter for a snack cup, which adapter and snack cup comprise optional components of the console for storing personal items.

Optionally, a mug adapter 140 may be inserted into the snack cup 50. As shown in FIG. 10, the mug adapter 140 has a frame 142 that seats on the top rim of the snack cup 50. The mug adapter has a central opening 144 therethrough, and has corner grooves 146*a*, 146*b*, 146*c*, 146*d* that communicate with the central opening. A coffee mug with a depending handle may be held within the snack cup 50 by inserting the coffee mug into the central opening 144 of the mug adapter 140, while also aligning the mug handle for insertion into one of the corner grooves 146.

Figure 12:
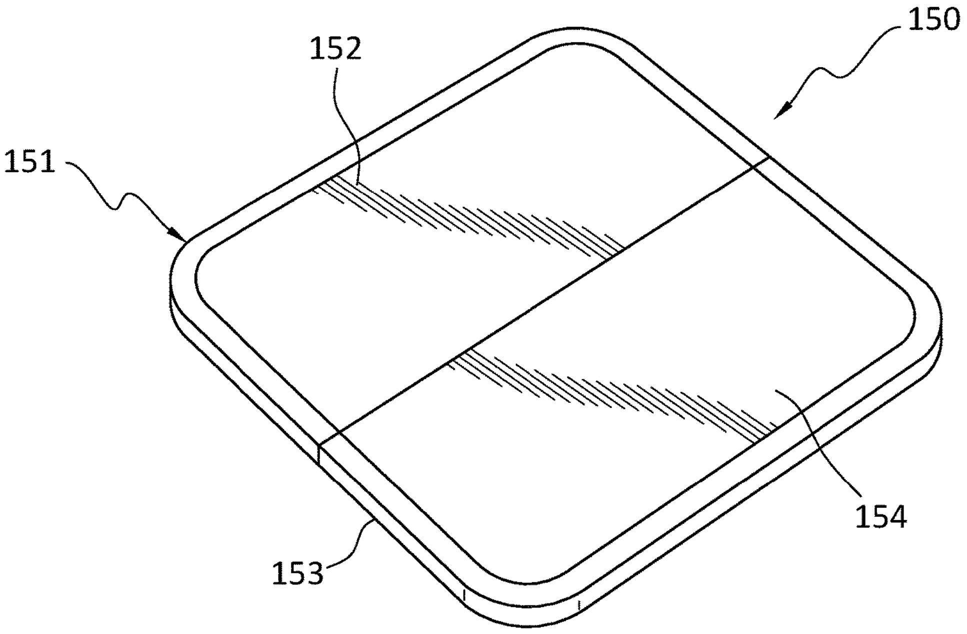
FIG. 12 is a top perspective view of a tray cover for the console for storing personal items, wherein the tray cover is shown in closed configuration.
Figure 13:
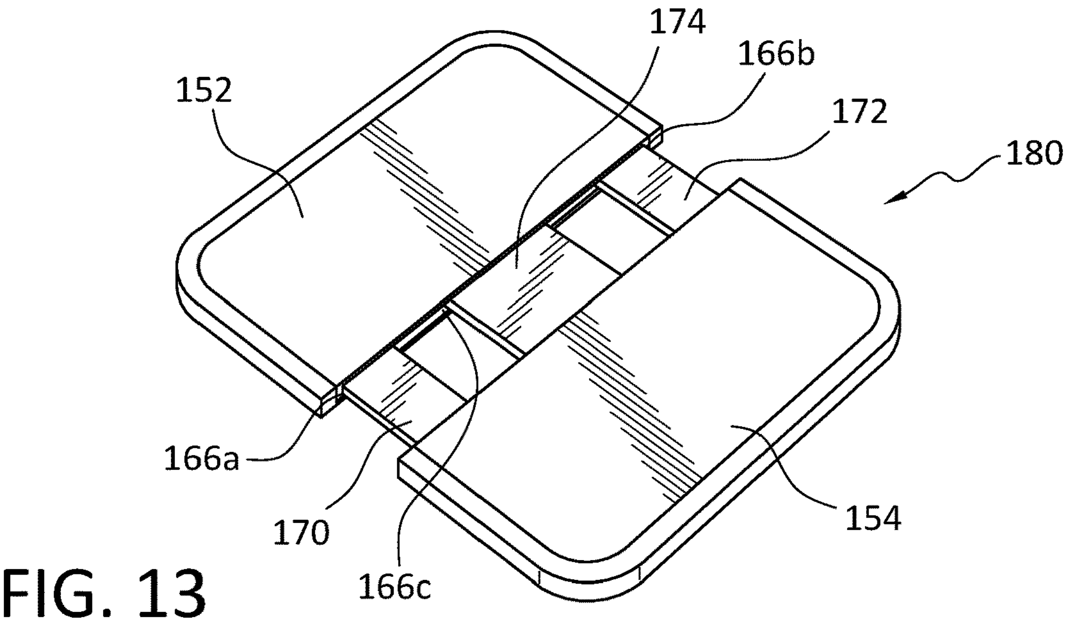
FIG. 13 is a top perspective view of a tray cover for the console for storing personal items of FIG. 12, wherein the tray cover is shown in open configuration.
Figure 14:
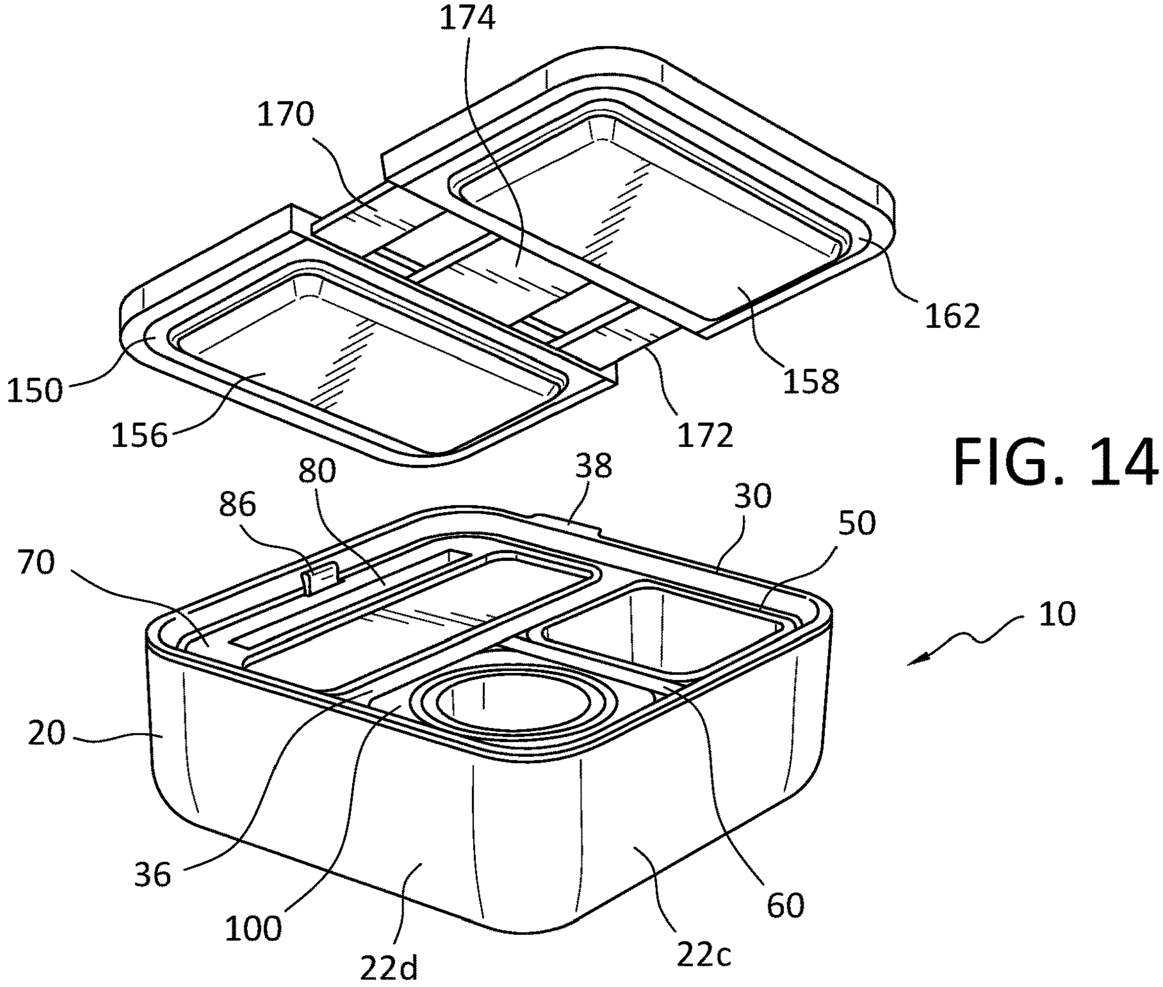
FIG. 14 is a perspective view of the tray cover positioned over the console for storing personal items.
Figure 15:
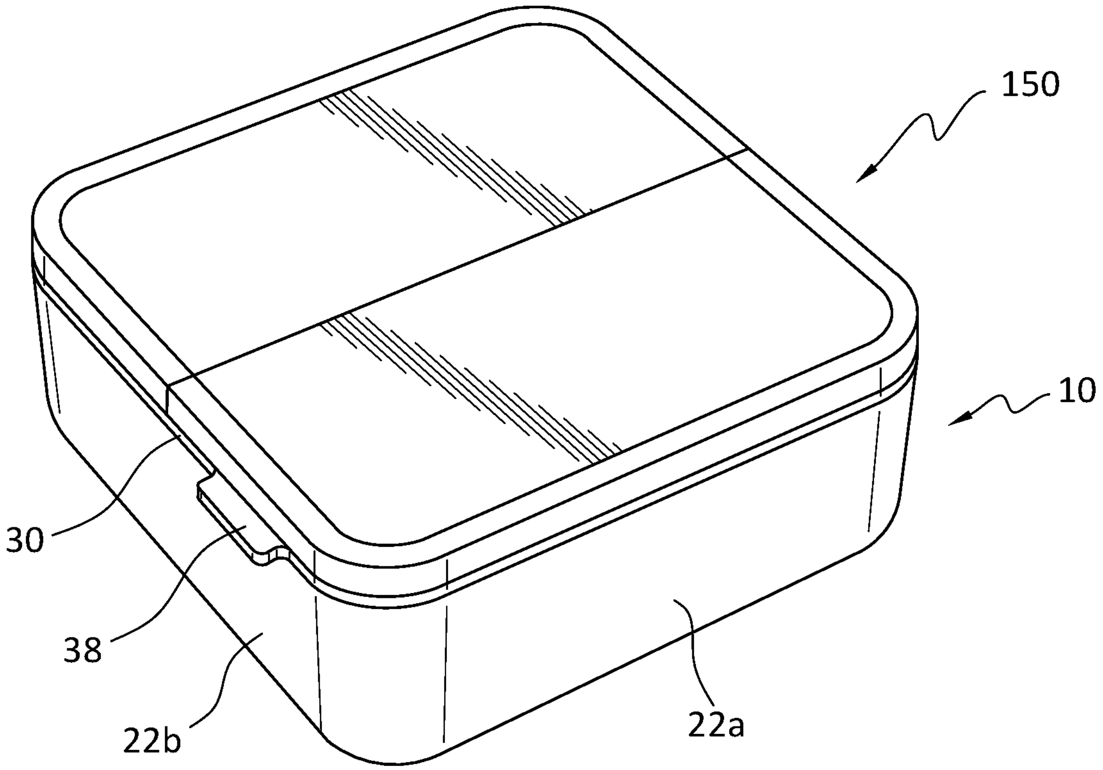
FIG. 15 is a perspective view of the console for storing personal items cover by the tray cover.

Referring next to FIGS. 12-14, the console 10 may be covered with removable a cover 150 that also converts to form a lap tray. The cover 150 has a first tray with a top surface 152 and a bottom surface 156 opposite the top surface 152, and has a second tray with a second top surface 154 and a second bottom surface 158 opposite the second top surface 154. With the cover 150 in a closed position, edges of the first tray and the second tray are adjacent to one another and preferably contact one another. A recessed portion 160 in the bottom surface 156 and a recessed portion 162 in the second bottom surface 158 are suitably dimensioned to receive portions of the top rim 28 of the tub 20 so that the cover 150 may be seated onto the tub 20. As shown in FIGS. 11 and 14, the cover 150 is seated over and onto the rim 28 of the tub 20, covering the inner volume of the tub 20. The spacer guide frame 30, tray 70, snack cup 50, cup holder 100 and spacer 60 may remain inside the tub 20 when the cover 150 is installed over and onto the rim 28.

The first tray and the second tray define guide rail channels 166*a*, 166*b*, 166*c* into which a first guide rail 170, a second guide rail 172 and a third guide rail 174 are held. At the user's option, the cover 150 may be converted to a lap tray 180 (see FIG. 13). The cover 150 is removed from the tub 20. The adjacent edges of the first tray and the second tray are separated from one another by sliding the first tray and the second tray along the guide rails 170, 172, 174. When the first tray and second tray are spaced apart, the cover forms the lap tray 180 suitable for supporting a laptop or a book or other workplace accessory.

Figure 16:
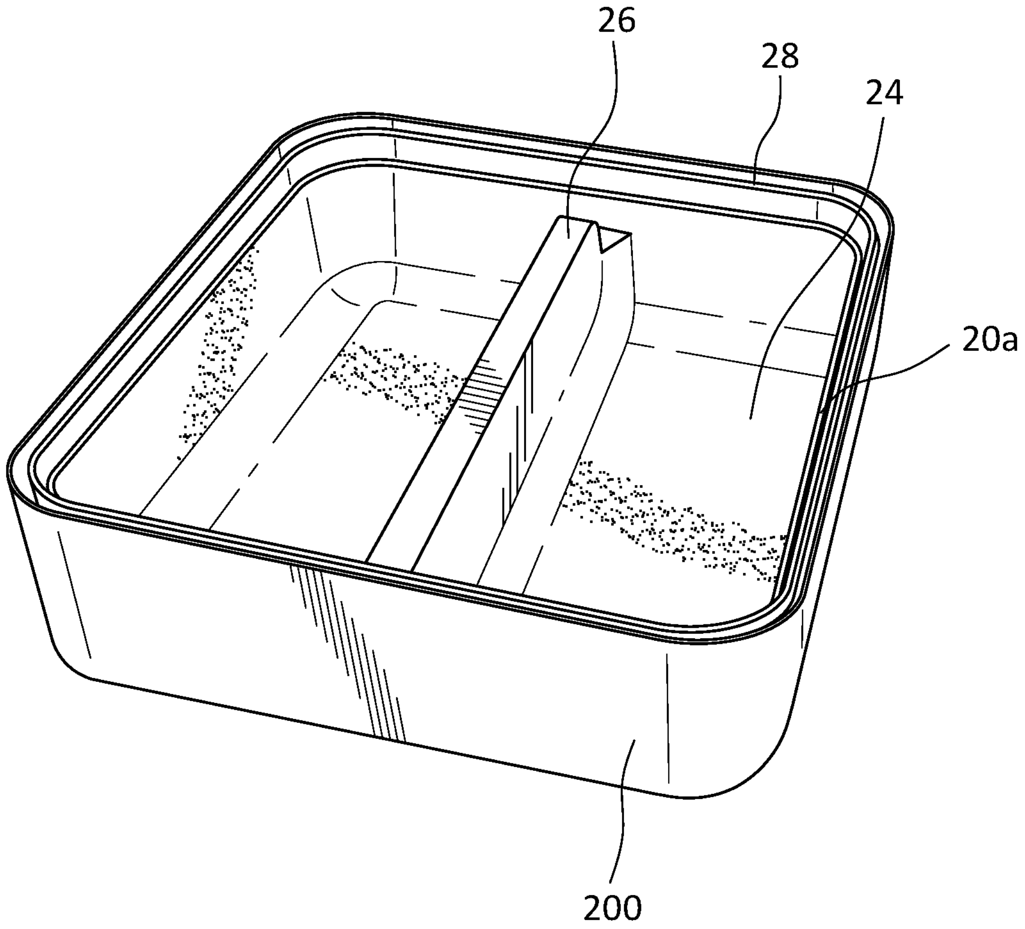
FIG. 16 is a perspective view of a hard thermoplastic shell surrounding the tub formed of a foam.
Figure 17:
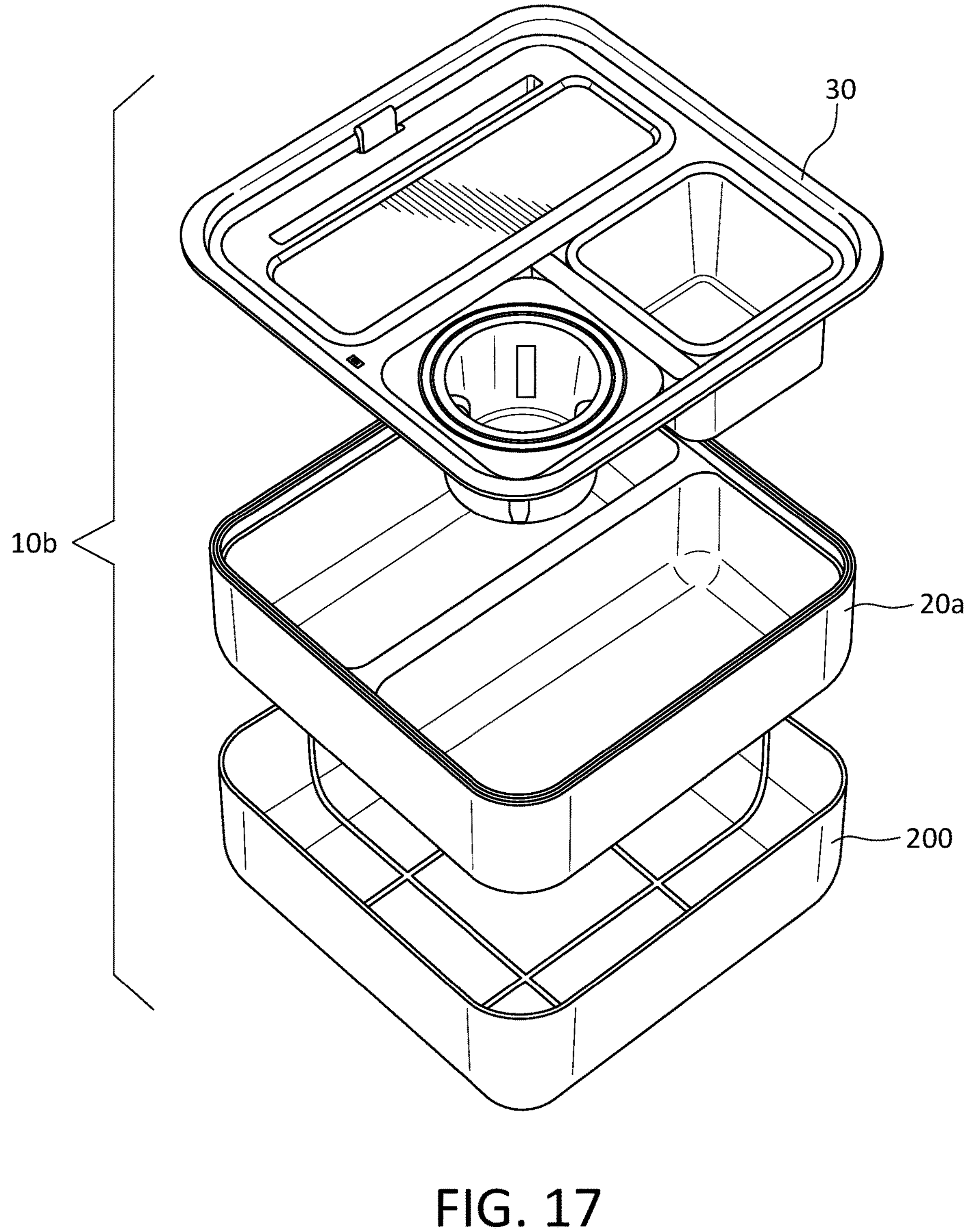
FIG. 17 is an exploded view of a console for storing personal items that includes the hard thermoplastic shell and tub of FIG. 16.

FIGS. 16 and 17 show another console 10*b* for personal items that has a tub 20*a* with an inner vertical wall 26 within the tub inner volume space. The tub 20*a* is removably seated within a shell 200. The shell 200 defines an inner volume and surrounds the bottom and sidewalls of the tub 20*a*. The tub 20*a* preferably is formed of a foamed material, and the outside shell 200 preferably is formed of a rigid or semi-rigid material that is not foam, such as a thermoplastic. In one embodiment, the tub 20*a* is ethyl 3-ethoxyproprionate (EEP) and the shell 200 is molded acrylonitrile-butadiene-styrene (ABS) terpolymer.

FIGS. 18 and 19 show the console 10*a* with an alternative tray 270 that includes a top tray surface comparable to that of tray 70 in the embodiment shown in FIG. 1, and a bottom tray surface to which a pad 276 is appended, applied or formed. If the tray 270 is inverted to place the pad 276 facing upwardly as shown in FIG. 19, the console 10*a* can be used as an arm rest. A grip tab 286 is provided for the user to grasp and use when inverting the tray 270 from one configuration with the hard top tray surface to the alternative inverted or flipped configuration with the pad 276 directed upwardly. The pad may be formed of viscoelastic memory foam, or a foam encased in a vinyl or other washable cover.

Additional objectives, advantages, features and application possibilities of the present invention ensue from the description of embodiments making reference to the drawings. In this context, all of the described and/or depicted features, either on their own or in any meaningful combination, constitute the subject matter of the present invention, also irrespective of their compilation in the claims or the claims to which they refer back.

REFERENCE NUMERALS

10, 10*a*, 10*b* console
11 eyeglasses
12 drink
14 snack
15 snack
16 cellular phone/handheld electronic device
17 tablet computer
18 video game handset
19 T.V. remote
20, 20*a* tub or bucket
22*a*, 22*b*, 22*c*, 22*d* sidewalls
24 bottom wall within interior of tub or bucket
26 interior vertical wall
28 rim of tub
30 spacer guide frame
32 surrounding top lip
34 sidewall spacer guide
36 center beam
38 tab extending from top lip
40 first window
42 second window
44 charging plug receptacle—USB C hub
45 charge cord
46*a*, 46*b*, 46*c*, 46*d* inner edges of first window
48*a*, 48*b*, 48*c*, 48*d* inner edges of second window
50 snack cup
52*a*, 52*b*, 52*c*, 52*d* sidewalls of snack cup
54 bottom wall of snack cup
60 spacer guide
62 hinged first panel
64 hinged second panel
66 top bar of spacer guide
68 projections to which first panel and second panel are rotatably joined
70 tray
72 top surface of tray
74 recessed area in tray top surface
80 slot in tray top surface
82*a*, 82*b*, 82*c*, 82*d* sidewalls of tray
86 grip tab for tray
88 pivot extension
90 Qi Standard wireless charging pad
100 cup holder
102 cylindrical sidewall
104 bottom wall of cup holder
106 spring actuated buttons
108 counterweight in bottom wall
110 upper rim frame of cup—first gimbal
112 circular opening in upper rim frame
120 second gimbal=ring
124 first dowel (joining ring to cup)
126 second dowel (joining ring to cup)
134 third dowel (joining ring to frame)
136 fourth dowel (joining ring to frame)

140 mug adapter for snack cup
142 frame of mug adapter
144 central opening of mug adapter
146*a*, 146*b*, 146*c*, 146*d* grooves
150 cover to console
151 first tray section
152 top surface first tray of cover
153 second tray section
154 top surface second tray of cover
156 bottom surface first tray of cover
158 bottom surface second tray of cover
160 recessed portion in bottom (to engage with bucket or tub)
162 recessed portion in bottom (to engage with inner wall of bucket or tub)
166*a*, 166*b*, 166*c* guide rail channels in first tray of cover
168 guide rail channels in second tray of cover
170 first guide rail
172 second guide rail
174 third guide rail
180 lap tray
200 shell
270 tray
276 pad
286 tab

The invention claimed is:

1. A console for personal items, comprising:

a tub having one or more upstanding sidewalls surrounding a bottom wall to define an inner volume;

a spacer guide frame removably held within the inner volume of the tub, said spacer guide frame defining at least two open windows therein;

a tray having a top surface surrounded by peripheral edges and a bottom surface opposite the top surface; and a pad integrally formed onto or appended onto the bottom surface of the tray;

wherein said tray is removably seated in a first one of the at least two open windows of the spacer guide frame, with all or substantially all of the peripheral edges of the tray supported on the spacer guide frame, with said tray adapted for seating in the first open window in a first orientation with its top surface facing upward, and alternatively for seating in the first open window in a second orientation with its bottom surface and the pad thereon facing upward.

2. The console of claim 1, further comprising a cup holder removably seated in the second one of the at least two open windows of the spacer guide frame, said cup holder having at least one upstanding sidewall surrounding a cup holder bottom wall to define an inner volume configured to receive a beverage container or a cup, and an upper frame surrounding a top rim of the cup holder, wherein said upper frame is supported at least in part by the spacer guide frame when the cup holder is seated in the second one of the at least two open windows of the spacer guide frame.

3. The console of claim 2, further comprising a counterweight within or on the bottom wall of the cup holder.

4. The console of claim 2, further comprising a snack cup removably seated in the second one of the at least two open windows in the spacer guide frame together with the cup holder, wherein said snack cup has an upper flange and at least a portion of the upper flange is supported by the spacer guide frame.

5. The console of claim 4, further comprising a spacer unit positioned between the cup holder and the snack cup.

6. The console of claim 1, further comprising a snack cup removably seated in the second one of the at least two open windows in the spacer guide frame, said snack cup having an upper flange wherein at least a portion of the upper flange is supported by the spacer guide frame.

7. The console of claim 6, further comprising an adapter removably held within the snack cup, said adapter defining a central opening configured to receive a drink mug that has a mug handle, said adapter further defining at least one groove communicating with the central opening that is configured to receive the mug handle when the drink mug is held within the snack cup.

8. The console of claim 1, further comprising a spacer unit positioned in the second one of the at least two open windows of the spacer guide frame.

9. The console of claim 8, wherein the spacer unit has hinged flaps adapted for rotation in respect of a center bar of the spacer unit, and wherein one or both of the hinged flaps is configured to rotate from a first orientation to a second orientation, wherein more of the second open window of the spacer guide frame is covered over by the hinged flaps when said hinged flaps are in the second orientation.

10. The console of claim 1, wherein the top surface of the tray is recessed.

11. The console of claim 1, further comprising an inductive battery charger for electronic devices associated with the tray.

12. The console of claim 1, further comprising a USB C hub disposed on or in the spacer guide frame, said USB C hub configured for connection to a connecting cord for an electronic device and for connection to a battery stored within the volume of the tub.

13. The console of claim 1, further comprising a tab extending from the tray.

14. The console of claim 1, further comprising a grip tab extending from the spacer guide frame.

15. The console of claim 1, further comprising an exterior shell, wherein the tub is seated within the shell.

16. The console of claim 1, wherein the tub is formed of a thermoplastic polymer.

* * * * *